R. MIGLIETTA.
ICE CREAM CONE MACHINE.
APPLICATION FILED MAR. 28, 1921.
1,418,195.
Patented May 30, 1922.
3 SHEETS—SHEET 1.
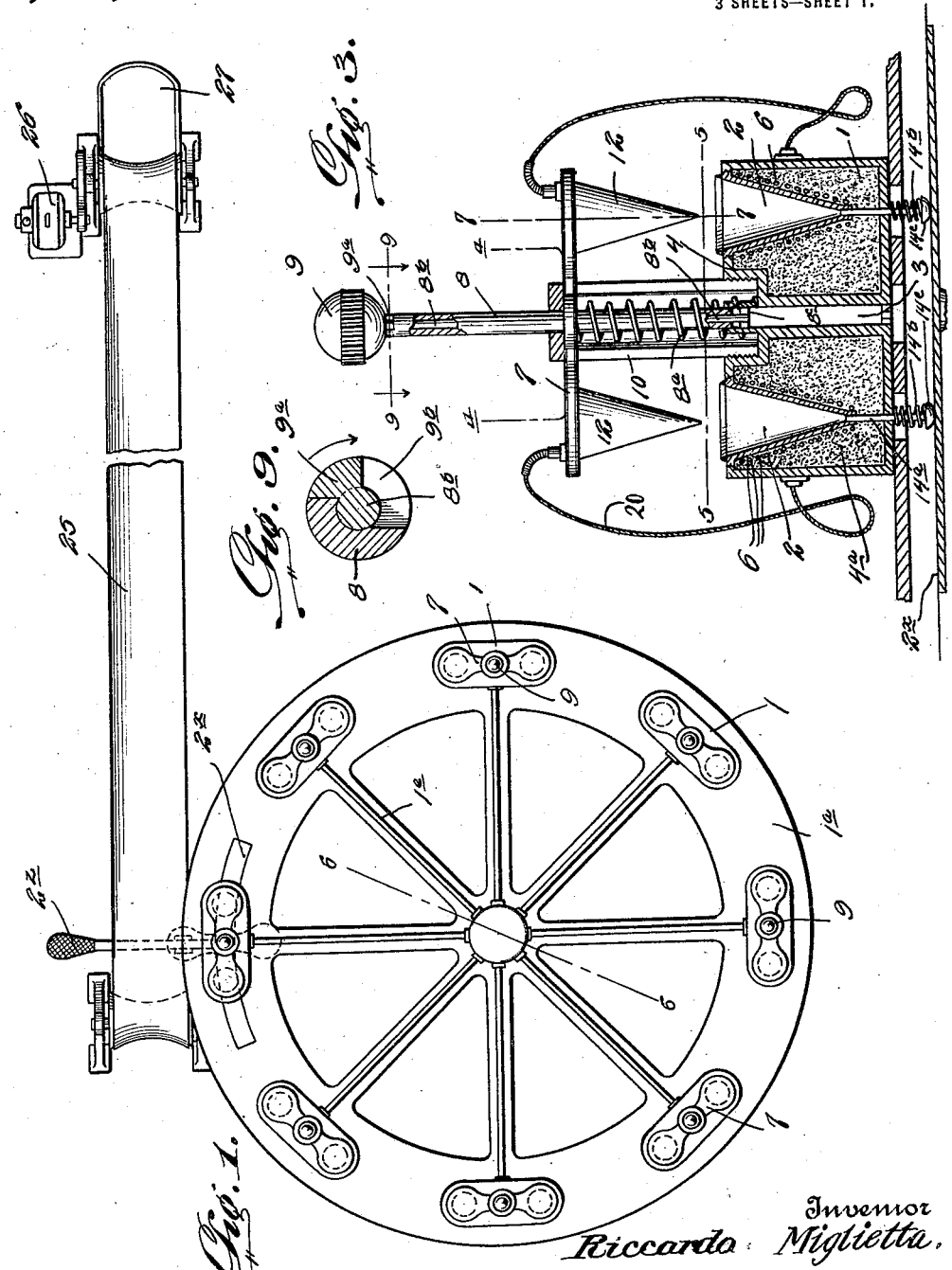
Inventor
Riccardo Miglietta.
Witnesses
Frederick L. Fox
Thos. E. Turpin
By Victor J. Evans.
Attorney

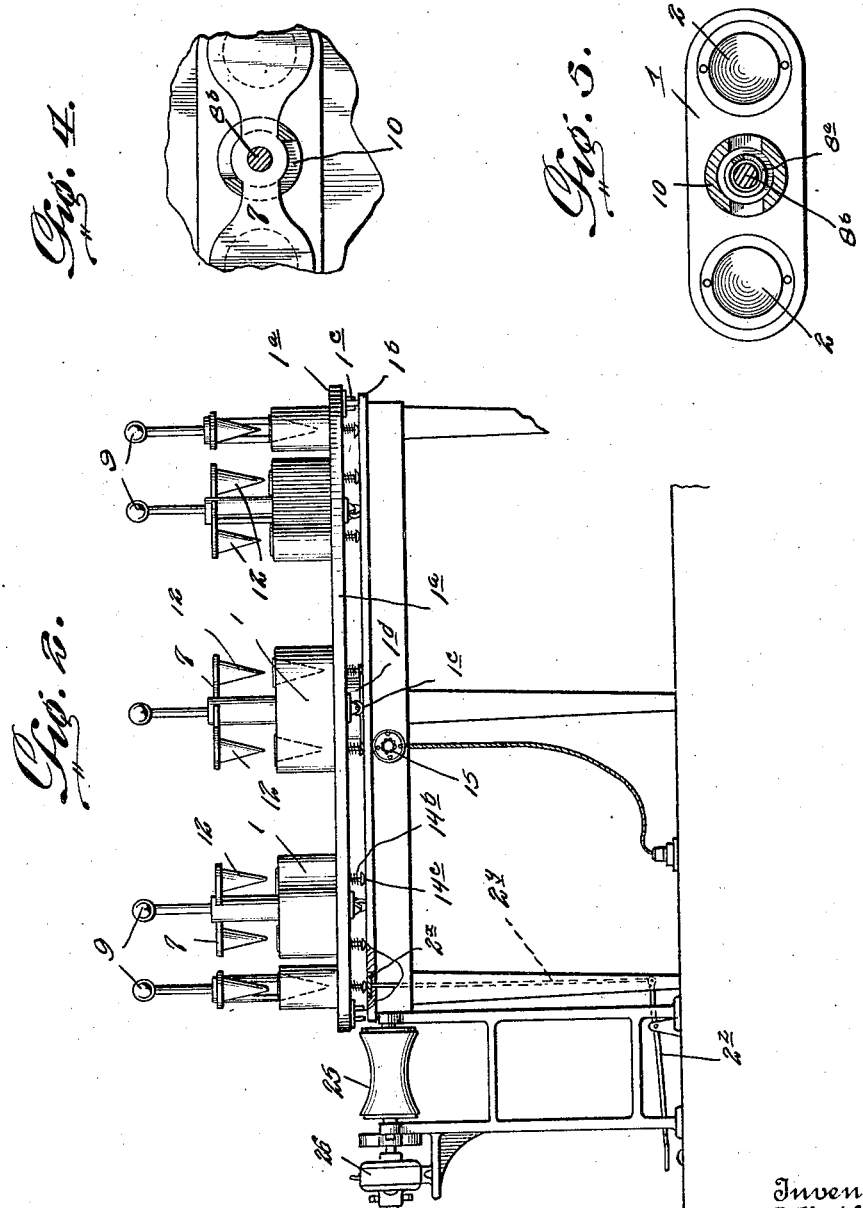

R. MIGLIETTA.
ICE CREAM CONE MACHINE.
APPLICATION FILED MAR. 28, 1921.
1,418,195.
Patented May 30, 1922.
3 SHEETS—SHEET 3.
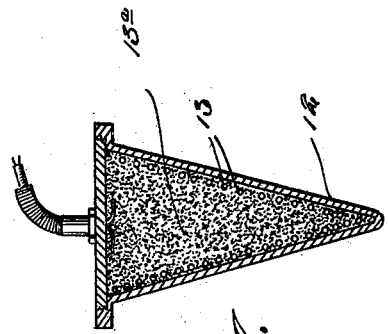
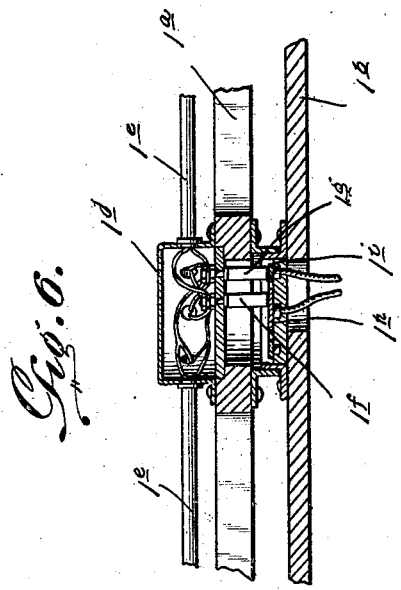
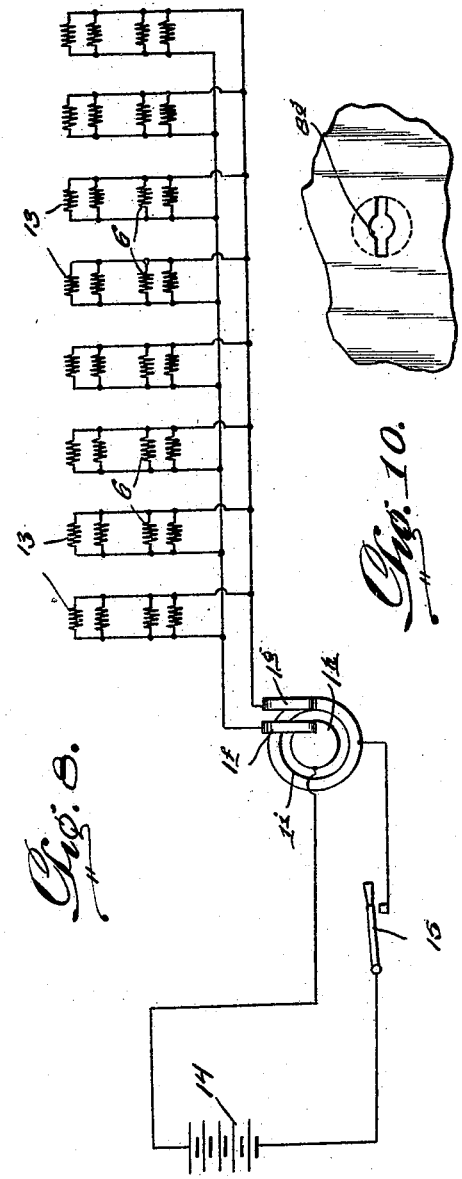
Inventor
Riccardo Miglietta
By Victor J. Evans.
Attorney
Witnesses
Frederick L. Fox,

UNITED STATES PATENT OFFICE.

RICCARDO MIGLIETTA, OF MERIDEN, CONNECTICUT.

ICE-CREAM-CONE MACHINE.

1,418,195. Specification of Letters Patent. Patented May 30, 1922.

Application filed March 28, 1921. Serial No. 456,452.

*To all whom it may concern:*

Be it known that I, RICCARDO MIGLIETTA, a subject of the King of Italy, residing at Meriden, in the county of New Haven and State of Connecticut, have invented new and useful Improvements in Ice-Cream-Cone Machines, of which the following is a specification.

The general object of my invention is the provision of a simple, easily operated and efficient apparatus for the expeditious and perfect production of ice cream cones of a dough-like plastic substance of the character now in general use, or of any other character suitable to the purpose. Ordinarily the said dough-like substance will be in the nature of a confection or cake, so that it may be eaten incidental to the consumption of the ice cream that is placed therein.

With the foregoing in mind the invention in all of its details will be fully understood from the following description and claims when the same are read in connection with the drawings, accompanying and forming part of this specification, in which:—

Figure 1 is a plan view of the apparatus constituting the best practical embodiment of my invention that I have as yet devised.

Figure 2 is an elevation of the same.

Figure 3 is a vertical section showing a pair of the male members of the apparatus in their normal raised position.

Figure 4 is a horizontal section taken in the plane indicated by the line 4—4 of Figure 3.

Figure 5 is a detail section on line 5—5 of Figure 3.

Figure 6 is a detail section on line 6—6 of Figure 1.

Figure 7 is a section on line 7—7 of Figure 3.

Figure 8 is a diagram showing the electrical connections.

Figure 9 is a detail section on line 9—9 of Figure 3.

Figure 10 is a detail hereinafter explicitly referred to.

Similar numerals of reference designate corresponding parts in all of the views of the drawings.

Among other elements my novel apparatus comprises a plurality of holding bodies 1 in each of which is one or more, preferably two, cone-shaped receptacles or female members 2, arranged with their comparatively large ends uppermost and substantially flush with the upper side of the body 1.

Rising from the central portion of the bottom of each body 1, Figure 3, is a standard 3 that is hollow, and illustrated, and is provided at its upper end with a countersunk enlargement 4.

Grouped about the receptacles or female members 2, and preferably arranged in close proximity thereto are resistance coils 6; it being understood in this connection that the walls of the receptacles 2 are of metal or other conductive material compatible with the purpose of my invention, and capable of being heated by the heat given off from the resistance coils. I would also have it understood at this point that it is in accordance with my invention to fill the bodies 1 with insulating material $4^a$, and this feature I illustrate in Figure 3 because it is important to the successful practice of the invention that the heat afforded by the passage of electrical current through the resistance coils 6 be confined in proximity to the receptacles 2.

Movable vertically with respect to each pair of receptacles 2 is a head 7, and connected to the said head 7 and disposed in the standard 3 is a stem or shank 8 on the upper end of which is supported a knob or handle 9. An upright guide 10 is fixed to the body 1 and receives the head 7, Figures 3 and 4. These provisions are made in order that the male or cone members 12 on each head 7 may be moved from and to position in practically exact registration with the female members or receptacles 2 below the same. The said male members or cones may be of any material compatible with the purpose of the invention, provided such material is a good conductor of heat.

Surrounding each stem 8 is a coiled spring $8^a$ that tends to raise and maintain in raised position the head 7 and cones 12, and arranged in each stem 8 is a rod $8^b$, Figures 3 and 9 on which is a T-head $8^c$ to enter a slot $8^d$, Figures 3 and 10, in the bottom of the body 1, whereby the head 7 and cones 12 may be detachably secured in depressed position when occasion demands. The knob or handle 9 while supported on the stem 8 is fixed to the rod $8^b$, and it will be observed by reference to Figure 9 that the knob 9 is provided with a sector-shaped portion $9^a$ that is movable in a recess $9^b$ of the stem 8 so that the operator can determine when the T-head $8^c$ is in position to pass through the slot 8ᵈ and when it is positioned at an angle to said slot. By reference to Figure 4 it will be observed that the uprights of the guide 10 are so relatively arranged that the head 7 may be swung from the position shown in Figure 3 to a position at right angles to the illustrated position, this in order to permit of cones being readily placed in and removed from the receptacles 2. Complementary to each receptacle 2 is a follower 14ᵃ, yieldingly held against upward movement by a spring 14ᵇ, and having a shoe 14ᶜ at its lower end.

As clearly shown in Figures 1 and 2 a circular series of bodies 1 equipped as described are fixed on a revoluble carrier 1ᵃ, mounted on a table 1ᵇ, Figure 6, and supported by wheels 1ᶜ, arranged to travel on the table 1ᶜ. It will also be observed by comparison to Figures 1, 2 and 6 that the wheel-like carrier 1ᵃ is provided with a central housing 1ᵈ and radial conduits 1ᵉ that extend between the housing 1ᵈ and the bodies 1; also, that the carrier 1ᵃ carries brushes 1ᶠ and 1ᵍ that are opposed to terminals 1ʰ and 1ⁱ, respectively, on the table 1ᵇ, the said terminals being electrically connected to the poles of a source of electrical energy as appears in Figures 2 and 8.

Carried in the table 1ᵇ is a vertically-movable platform 2ˣ, Figures 1, 2 and 3, and under said platform is a plunger 2ʸ connected to one arm of a pedal lever 2ᶻ. When any two of the followers 14ᵃ are positioned above the platform 2ˣ and the lever 2ᶻ is operated, the followers 14ᵃ will be forced upwardly to loosen cones in the receptacles 2, and when the lever 2ᶻ is relieved of pressure, the spring 14ᵇ will operate to restore the parts to their normal positions.

Disposed within each of the male members 12 is a resistance coil 13 and insulating material 13ᵃ, Figure 7.

As clearly shown in Figure 8, the resistance coils 6 and the resistance coils 13 are arranged in parallel and electrically connected with a source of electric energy 14, and in the electrical installation is included a switch 15 so that current may be supplied to or cut off from the resistance coils at the pleasure of the operator. Manifestly the conductors 20 complementary to the resistance coils 13, Figure 3, will be flexible in character so as not to interfere with the reciprocation and the swinging of the male members 13 and the heads 7.

Appropriately supported alongside the table 1ᵇ is a conveyor 25, Figures 1 and 2, driven by an electric motor 26 and designed to carry finished cones to a receptacle 27, the cones being manually placed on the said conveyor as the cones are removed by the operator from the receptacles 2 in the manner before described.

In the practical operation of my novel apparatus the plastic or dough-like substance for the formation of the cones is placed by hand on two of the heated male members 12, after which said members are moved downwardly into the receptacles 2 and are locked in said positions. The carrier 1ᵃ is then manually turned a slight distance, and the operation is repeated on the following male members 12, and so on until the first mentioned male members 12 and their complementary body 1 again reach a position above the platform 2ˣ. The knob or handle 9 is then turned, whereupon the coiled spring 16 will raise the head 7. The said head 7 is then turned about its center so as to carry the cone-bearing members 12 out of alinement with the receptacles 2, whereupon the baked and completed cones are manually removed in the manner before described from the receptacles 2.

While for obvious reasons I prefer to employ electrical means for the heating of the receptacles 2 and the cones 12, it will be manifest that in the broader aspect of my invention the said receptacles 2 and members 12 may be heated by any other means compatible with the purpose of my invention.

Having described my invention, what I claim and desire to secure by Letters-Patent, is:—

1. In an apparatus for the purpose described, the combination of a body, inverted cone-shaped receptacles disposed in said body and open at their upper ends, resistance coils disposed in the body in close proximity to the receptacles and connected with a source of electric energy, a guide rising from the body, a head movable up and down in the guide and also movable about its center in the guide, a spring for raising said movable head, a stem connected with the head, a guide for said stem, inverted cone-shaped members carried by the head, resistance coils in said male members, and flexible conductors intermediate the body and said resistance coils.

2. In an apparatus for the purpose described, the combination of a body, inverted cone-shaped receptacles disposed in said body and open at their upper ends, resistance coils disposed in the body in close proximity to the receptacles and connected with a source of electric energy, a guide rising from the body, a head movable up and down in the guide and also movable about its center in the guide, a spring for raising said movable head, a stem connected with the head and guided to hold it against lateral deflection, inverted cone-shaped members carried by the head, resistance coils in said male members, flexible conductors between the body and said resistance coils, and a pin movable about its axis in the stem and having a head to detachably connect the cone-bearing head with the bottom of the body to hold said cone-bearing head detachably against upward movement.

3. The combination of a body, a cone-shaped receptacle therein, a guide rising from the body, a head arranged to swing within certain limits in said guide and carrying a pendent cone-shaped member, a stem guided in the body, a spring to raise the head, and a pin adjustable in the stem and adapted to effect detachable connection of the head with the body.

4. In an apparatus for making ice cream cones, the combination of a table, a carrier revoluble above the table, bodies arranged in a circular series and spaced relation on the carrier, cone-shaped receptacles in said bodies, spring-pressed followers movable upwardly in the receptacles, spring-pressed heads complementary to the bodies and carrying pendent cone-shaped members, means to detachably connect said heads with the bodies, a vertically movable platform in the table, and arranged under the path of the follower, and manual means to raise said platform.

5. In an apparatus for making ice cream cones, the combination of a table, a carrier revoluble above the table, bodies arranged in a circular series and spaced relation on the carrier, cone-shaped receptacles in said bodies, spring-pressed followers movable upwardly in the receptacles, spring-pressed heads complementary to the bodies and carrying pendent cone-shaped members, means to detachably connect said heads with the bodies, a vertically movable platform in the table and under the path of the followers, manual means to raise said platform, resistance coils complementary to the receptacles and the cone-shaped members, and electrical connections between said resistance coils, and a source of electric energy and including flexible conductors between the bodies and the resistance coils of the cone-shaped members and also including fixed terminals carried by the table and brushes complementary to said terminals and carried by the revoluble carrier.

In testimony whereof I affix my signature.

RICCARDO MIGLIETTA.